United States Patent
Mounes-Toussi

(10) Patent No.: US 6,651,143 B2
(45) Date of Patent: Nov. 18, 2003

(54) CACHE MANAGEMENT USING A BUFFER FOR INVALIDATION REQUESTS

(75) Inventor: Farnaz Mounes-Toussi, Minneapolis, MN (US)

(73) Assignee: International Business Machines Corporation, Armonk, NY (US)

( * ) Notice: Subject to any disclaimer, the term of this patent is extended or adjusted under 35 U.S.C. 154(b) by 321 days.

(21) Appl. No.: 09/745,340

(22) Filed: Dec. 21, 2000

(65) Prior Publication Data

US 2002/0083271 A1 Jun. 27, 2002

(51) Int. Cl.$^7$ ............................................... G06F 12/00
(52) U.S. Cl. ..................... 711/138; 711/144; 711/145; 711/134
(58) Field of Search ............................... 711/138, 141, 711/144, 145, 133, 134

(56) References Cited

U.S. PATENT DOCUMENTS

| | | | | |
|---|---|---|---|---|
| 4,142,234 A | | 2/1979 | Bean et al. ................. | 364/200 |
| 5,579,504 A | * | 11/1996 | Callander et al. ........... | 711/144 |
| 5,687,348 A | * | 11/1997 | Whittaker .................... | 711/133 |
| 5,737,756 A | * | 4/1998 | White et al. ................. | 711/142 |
| 5,845,324 A | * | 12/1998 | White et al. ................. | 711/128 |
| 6,000,015 A | * | 12/1999 | Whittaker .................... | 711/134 |
| 6,098,152 A | | 8/2000 | Mounes-Toussi ........... | 711/134 |
| 6,105,113 A | * | 8/2000 | Schimmel .................... | 711/146 |
| 6,470,437 B1 | * | 10/2002 | Lyon ........................... | 711/207 |
| 6,477,622 B1 | * | 11/2002 | Normoyle et al. ........... | 711/143 |

OTHER PUBLICATIONS

Dubois, Michel et al., "Delayed Consistency and its Effects on the Miss Rate of Parallel Programs", Proceedings of the 1991 Conference on Supercomputing, pp. 197–206.

* cited by examiner

Primary Examiner—Donald Sparks
Assistant Examiner—Brian R. Peugh
(74) Attorney, Agent, or Firm—Karuna Ojanen

(57) ABSTRACT

An invalidation buffer is associated with each cache wherein either multiple processors and/or multiple caches maintain cache coherency. Rather than to decode the addresses and interrogate the cache directory to determine if data requested by an incoming command is in a cache, the invalidation buffer is quickly checked to determine if the data associated with the requested data has been recently invalidated. If so and if the command is not intended to replace the recently invalidated data, then the tag and data array of the cache are immediately bypassed to save precious processor time. If lower level caches maintain the same cache coherency and are accessed only through an adjacent cache, then those lower level caches may also be bypassed and a cache miss can be directed immediately to memory. In a multiprocessor system, such as NUMA, COMA, SMP, where other processors may access different cache levels independent of the adjacent cache level, then each invalidation buffer is checked. If the data is not in the invalidation buffer, a speculative cache hit can be generated and transferred to the requesting processor or upper level cache for earlier processing or to reserve a cache block, respectively.

5 Claims, 10 Drawing Sheets

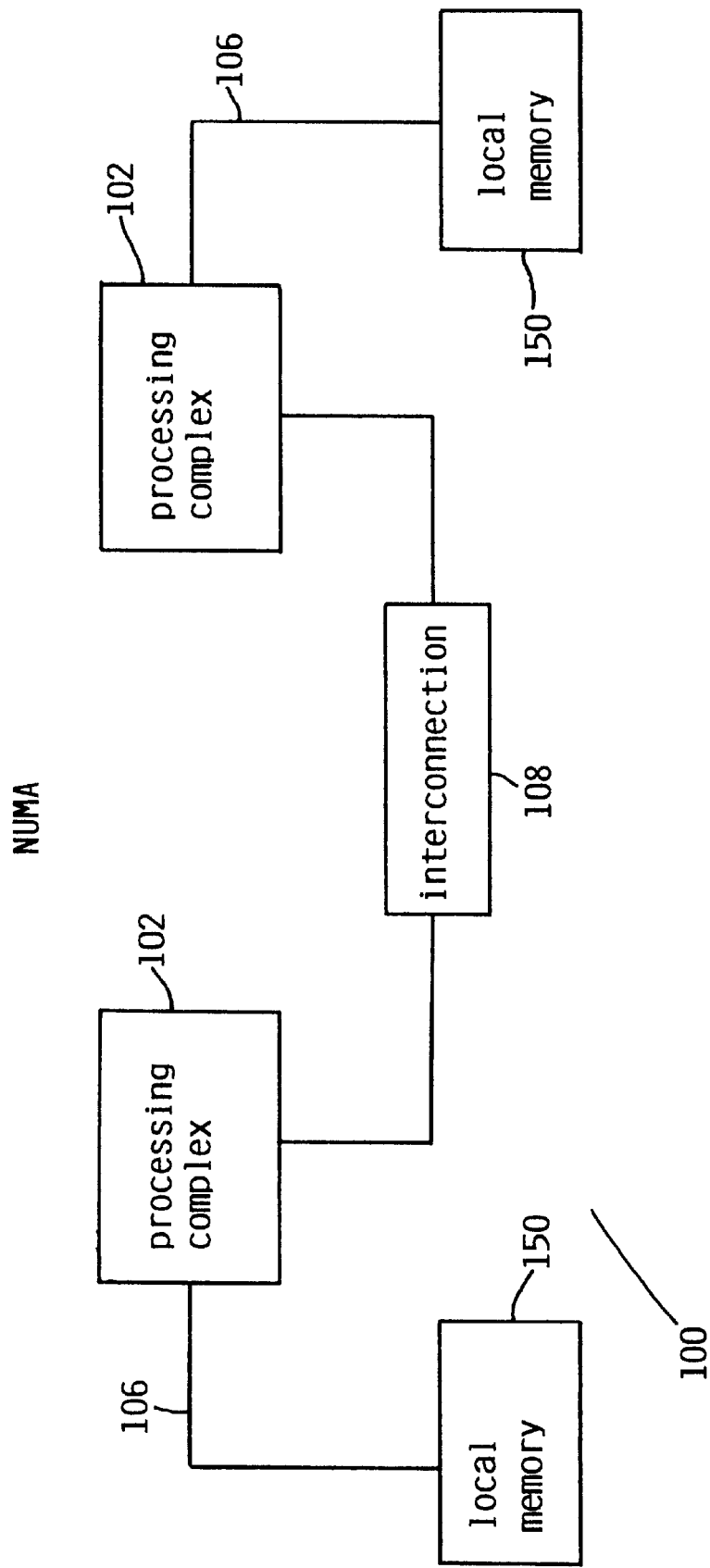
FIG. IC (PRIOR ART)

CACHE MANAGEMENT USING A BUFFER FOR INVALIDATION REQUESTS

FIELD OF THE INVENTION

This invention relates generally to field of computer processing and more specifically relates to a method and apparatus to eliminate unnecessary detection of hardware cache misses.

BACKGROUND OF THE INVENTION

Computer architecture refers to the physical structure and interconnections of the registers, logical and arithmetic units, control units, and other hardware within a computer. All computers have at least one processor and more complex computers, such as servers, have many processors working together. Also, there are at least two kinds of memory devices associated with the computer: an internal volatile memory called random access memory which is erased when the computer is turned off; and an external memory, called a hard drive, which permanently stores the programs, also called applications, to be executed by a processor when called. Of course, there are a number of peripheral devices such as monitors, Internet connections, keypads, mouses, other pointing devices, other optical and magnetic drives, connections to other computers, etc. This invention is concerned with keeping the processor(s) busy.

The processor retrieves the applications or programs from the external memory into the internal memory. When data and/or instructions are needed for the application, the processor may retrieve the data/instructions from internal memory to its registers for arithmetic and logical processing. When the processor needs data/instructions from memory, it is idle until the data/instructions are available. Now that processor speeds are faster and faster, computer architects have directed an aspect of research and development into keeping the processor occupied and its registers filled for the next operation. One of many approaches taken by computer architects has been to minimize the time required to retrieve data/instructions from external and internal memory into the processor's registers. Incorporating smaller high speed memory units called caches nearer the memory is an implementation of this approach. These caches, moreover, may be hierarchical meaning that a level one (L1) cache is very close to the processor and is very fast which may be accessed in only one or very few processor cycles. There may be a L1 cache for instructions and a different L1 cache for data. There also may be level two (L2) and/or level three (L3) caches with the higher number denoting a larger, more distant, and perhaps slower cache but still closer and faster than either internal or external memory. Thus, when a processor needs data/instructions which is not readily available in its registers, it accesses its L1 cache by generating a control signal to access the cache directory and the data array in which the data is actually stored. A typical entry in a cache's directory, also called tag array, includes the cache coherency state of the data/instruction and a block address corresponding to the data in a data array of the cache. The address of the requested data/instruction is compared with the address in the cache's tag array. A cache miss occurs if the addresses of data/instructions do not match; a cache hit occurs if the addresses do match and the state is not invalid. If there is a L1 cache miss, the processor interrogates the L2 cache directory for the address of the requested data/instructions. If there is a L2 cache miss, the processor checks to see if the data/instruction is in the next layer's cache directory and so on until, if the data/instructions are not in any cache, it retrieves the data/instructions from memory. Access to a L1 cache typically takes on the order of one or just a few processor cycles with L2 and L3 cache accesses taking more cycles. Interrogating each of these caches may take a long time and actually degrade processor performance in the absence of nonblocking caches. Introducing resource conflicts may prevent the cache controllers to respond at optimum speed to incoming requests.

Managing the data in the caches has become a science in and of itself. There is always a cache management scheme, an example of which is that the most recently used (MRU) data and/or instructions are stored in the L1 cache. When the L1 cache gets full, then the oldest data/instructions may spill over to fill the L2 cache and so on. There are other cache management schemes, such as in U.S. Pat. No. 6,098,152 entitled Method and Apparatus for Miss Sequence Cache Block Replacement Utilizing a Most Recently Used State to Mounes-Toussi issued Aug. 1, 2000. Caches, moreover, may be accessed by different processors so that the same data/instructions, whether accessed by different processors or within different caches, must be checked before use to determine if the data is valid. For instance, if processor 1 has data in its cache and processor 2 is executing an operation to change that data, then processor 2 should wait until processor 1 is guaranteed not to access stale data. Maintaining valid data/instructions in the various caches is accomplished by a cache coherency scheme, an example of which is MESI. Each entry in a cache is tagged to indicate its state, i.e., whether the data/instruction is Modified, Exclusive, Shared, or Invalid. Modified data is data that is being modified by a processor and so another processor should wait until the modification is complete. Exclusive data means that the processor having the data in its cache has exclusive control of the data. Shared data is shared by other processors; and Invalid data should not be used by any processor. There are many cache coherency schemes; the MESI protocol above is only one example.

Computer architectures come in a myriad of arrangements today wherein the multiple processors may share caches and/or memory. Shown in FIG. 1a is an example of a computer architecture 100 having a simple processor complex 102 which further comprises a processor 104 and a hierarchy of private caches, a L1 cache 110, a L2 cache 120 up to multiple cache levels Ln cache 140. The last cache level Ln 140 is typically connected over an internal bus 106 to memory 150 or other system bus interface (not shown).

FIG. 1b is an example of a computer architecture 100 having a multiprocessor processor complex 102, each processor complex 102 having two or more processors 104. Each processor 104 has a private L1 cache 110 and the two or more processors 104 within the same processor complex 102 may share a L2 cache 120, and/or a L3 cache 130 and/or a L4 cache on the various levels interconnecting different processors.

Each of the processor complexes 102 may then be configured into other computer architectures 100 in which the processor complexes 102 may share memory and/or higher level caches. FIG. 1c is an example of a computer architecture 100 referred to as Non-Uniform Memory Architecture (NUMA) characterized by distributed shared mapped memory. The computer's memory 150 is distributed in that each processor complex 102 is connected on an internal bus 106 to a local memory 150 with unique addresses. The local memory 150 of another processor complex 102 would have different addresses so that the processing complexes 102 would access each other's local memory for the address stored in that particular local memory going through the processor complex 102 via an interconnection 108. Another computer architecture 100 is shown in FIG. 1d and referred to as Cache Only Memory Architecture (COMA) in which each processor complex 102 has an attraction memory 150. An attraction memory 150 is basically a large cache and can be considered as the lowest level cache in the processor complex 102. Access to the attraction memory 150 is over an internal bus 106 through its respective processor complex 102. Yet, another computer architecture 100 is called Symmetric MultiProcessor (SMP) architecture of FIG. 1e in which the processor complexes 102 are interconnected on an internal bus 106 through an interconnection 108 and a system bus 115 to a shared mapped memory 150.

As can be seen with the various permutations of the processor complexes 102 and the computer architectures 100, one processor often accesses data in another processor's cache at various levels. Given these different architectures in which one processing unit may access data in another processing unit's cache, there is a need in the industry to quickly provide information about the state of data in a cache to avoid unnecessary and prolonged interrogations of multiple cache levels.

SUMMARY OF THE INVENTION

To satisfy these objectives and fulfill the need in the industry what is set forth is a method of managing a processor-cache system in a computer system wherein the method comprises the steps of storing addresses of invalidation requests to invalidate data in a cache in an invalidation buffer associated with the cache; receiving an incoming command for the cache; determining that an address associated with the incoming command is in the invalidation buffer; determining if the incoming command is to replace the invalidated address with a valid address and if not, bypassing the cache.

The address of the most recent invalidation requests may be stored in the invalidation buffer. If the incoming command, moreover, is to replace the invalidated address with a valid address, the method may deallocate the invalidated address.

A speculative cache hit may be generated when the address associated with the incoming command is not in the invalidation buffer and transferred to a processor or a higher level cache that forwarded the incoming command.

Another aspect of the invention may be considered a computer system for processing commands, comprising at least one processor to execute an operating system and commands, a main memory connected to at least one processor, at least one cache connected near and accessible by the at least one processor to provide and store data to/from the at least one processor, and at least one invalidation buffer associated with the at least one cache wherein invalidation requests are stored.

The computer system may further comprise at least one other processor connected to the cache(s) and capable of accessing the cache(s) wherein the processors accessing the cache(s) are able to see coherence operations. The computer system may yet further comprise at least one lower level cache connected to the processor(s), the lower level cache between the at least one cache and main memory and having a lower level invalidation buffer associated with it. In the computer system, there may yet be another processor connected to a lower level cache and its associated lower level invalidation buffer in which all the connected processors and caches maintain cache coherency.

The invention may also be considered a system for expediting cache misses in a processor, comprising means to cache data and corresponding addresses; means to buffer the most recent invalidation requests to invalidate data and addresses in the cache means; means to receiving a command having an address; means to determine if the command is to access the cache means; means to determine if the command address is within the buffer means; means to bypass the cache means if the command address is within the buffer means; and means to bypass all cache means having the command address if the command address is within the buffer means and if cache coherency is maintained by all cache means. There may be further means to generate a speculative hit of the cache means if the command address is not within the buffer means. In addition, there may be means to reserve an address block of an upper level cache means in response to the generating means.

Other objects, features, and characteristics of the invention; methods, operation, and functions of the related elements of the structure; combination of parts; and economies of manufacture will become apparent from the following detailed description of the preferred embodiments and accompanying Drawing, all of which form a part of this specification, wherein like reference numerals designate corresponding parts in the various figures.

DESCRIPTION OF DRAWING

FIGS. 1a, 1b, 1c, 1d, and 1e are simplified block diagrams of different cache arrangements within a processor complex of a variety of computer architectures.

DETAILED DESCRIPTION OF THE INVENTION

Figure 1A:
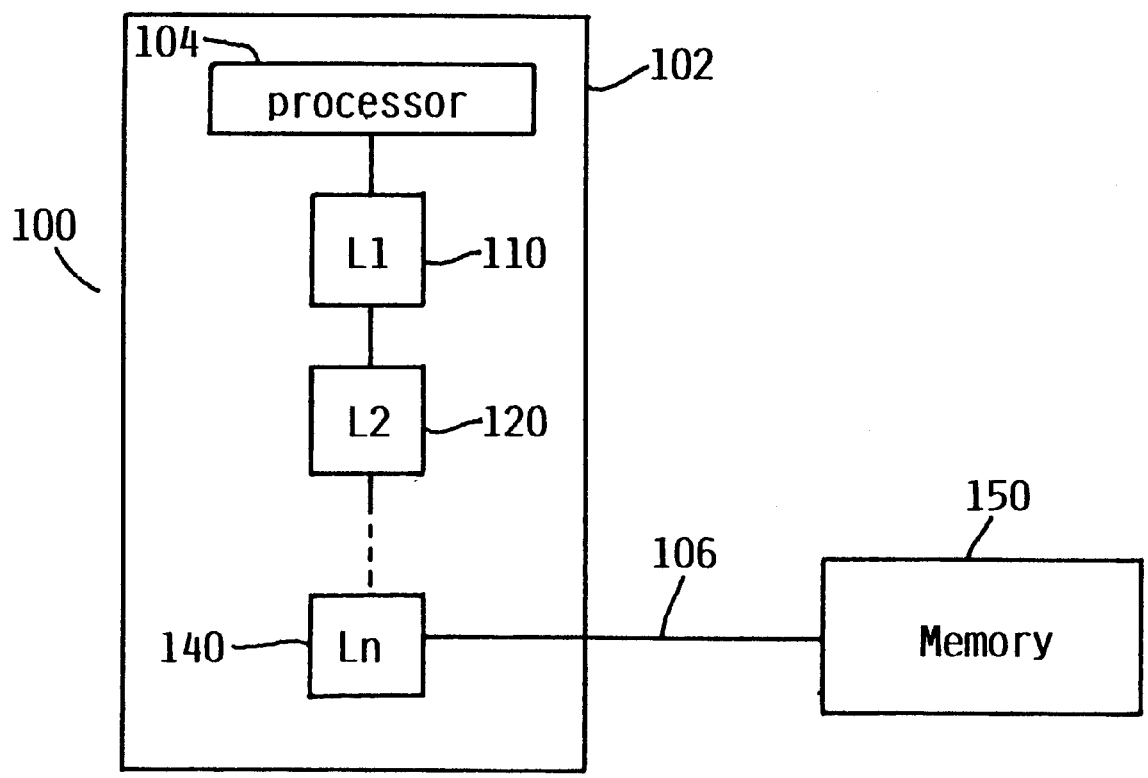
Figure 1B:
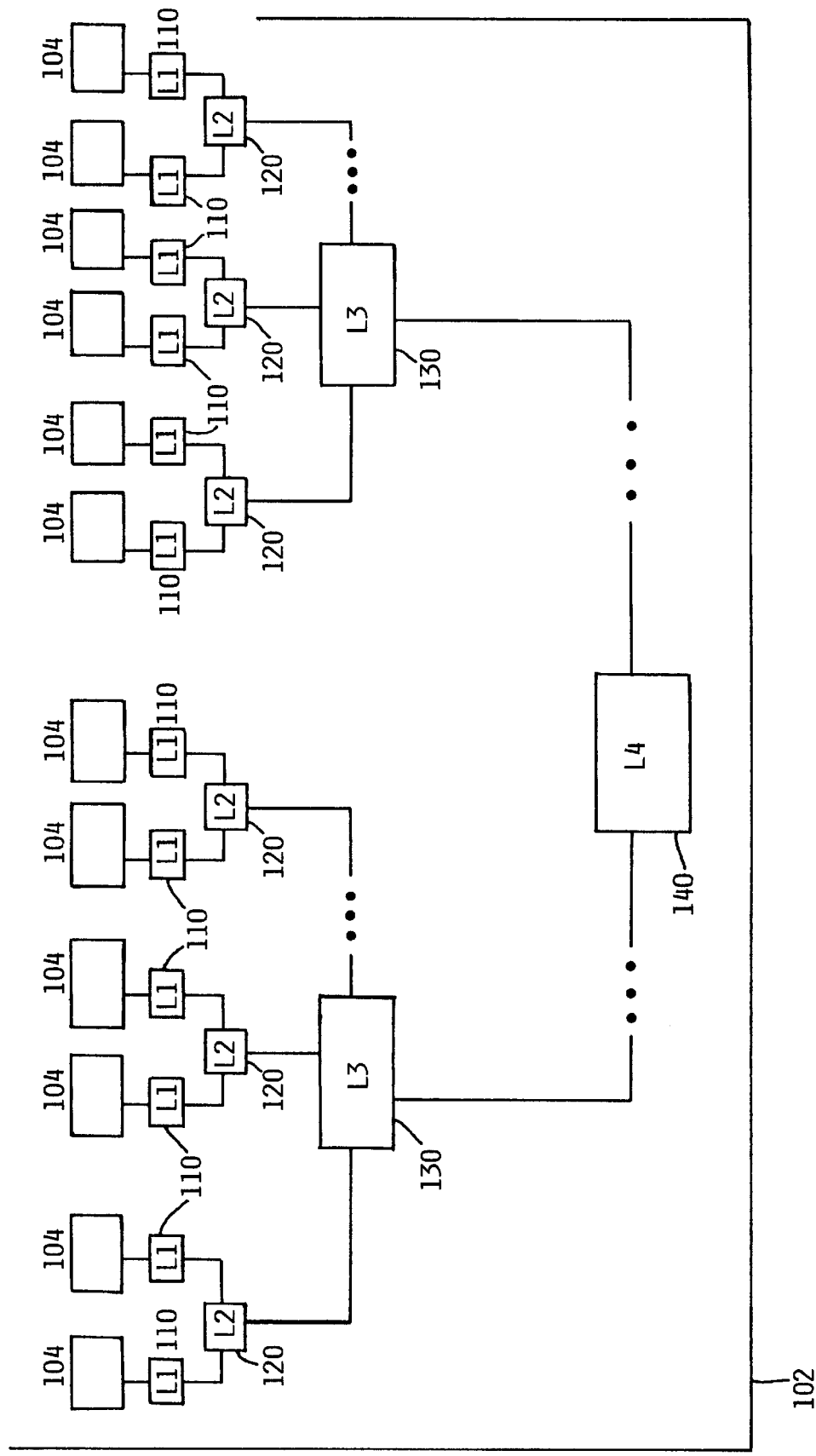
Figure 1D:
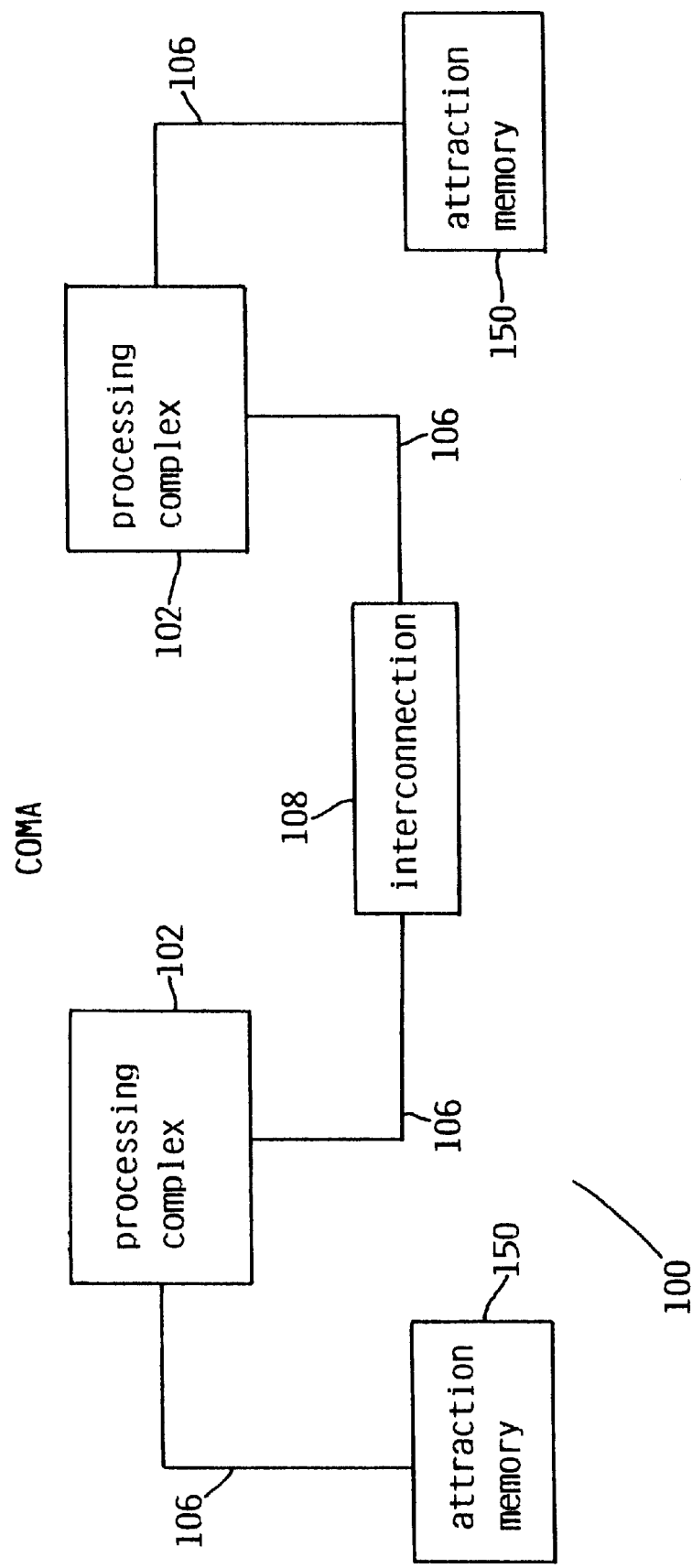
Figure 1E:
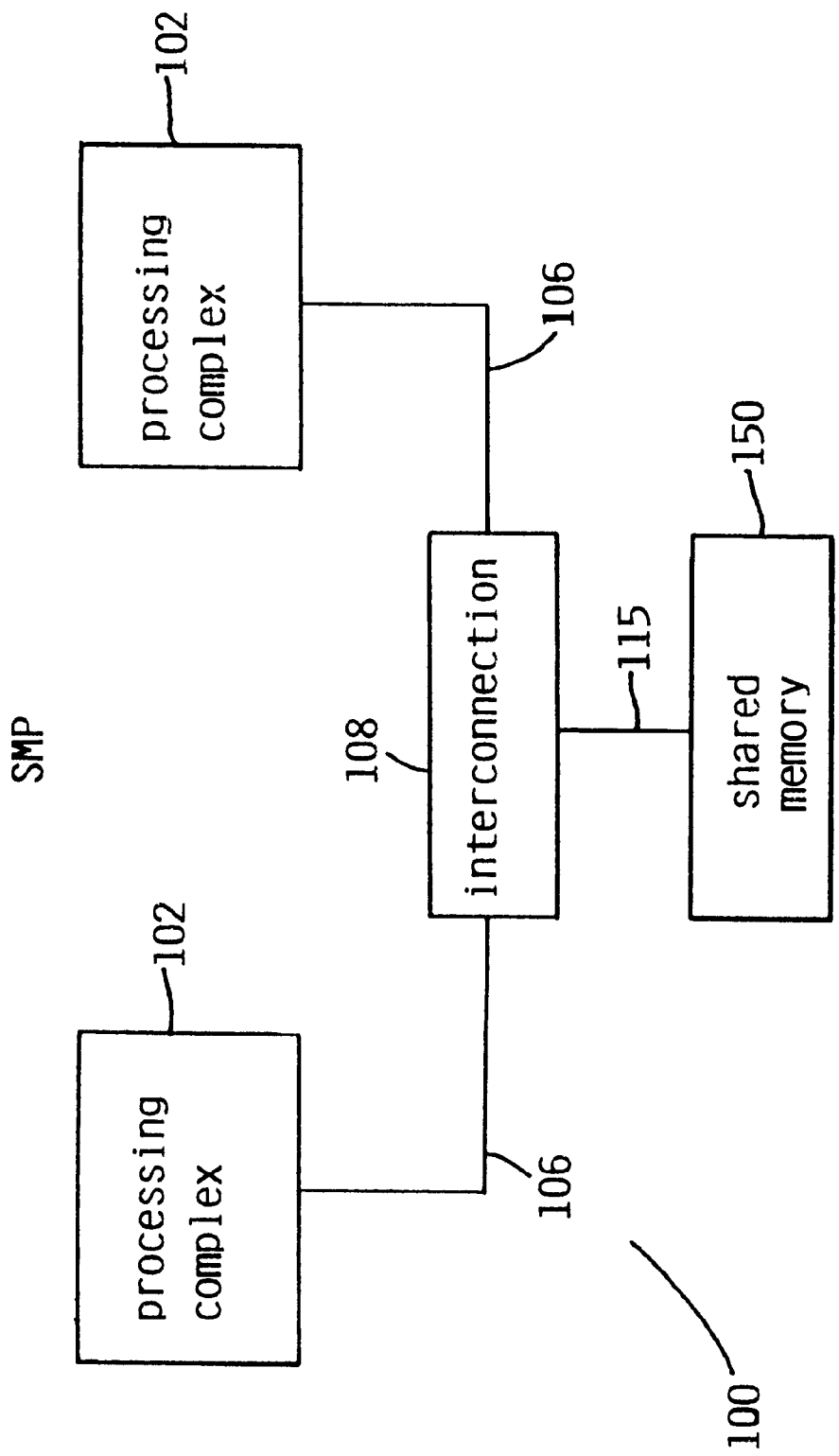
Figure 2:
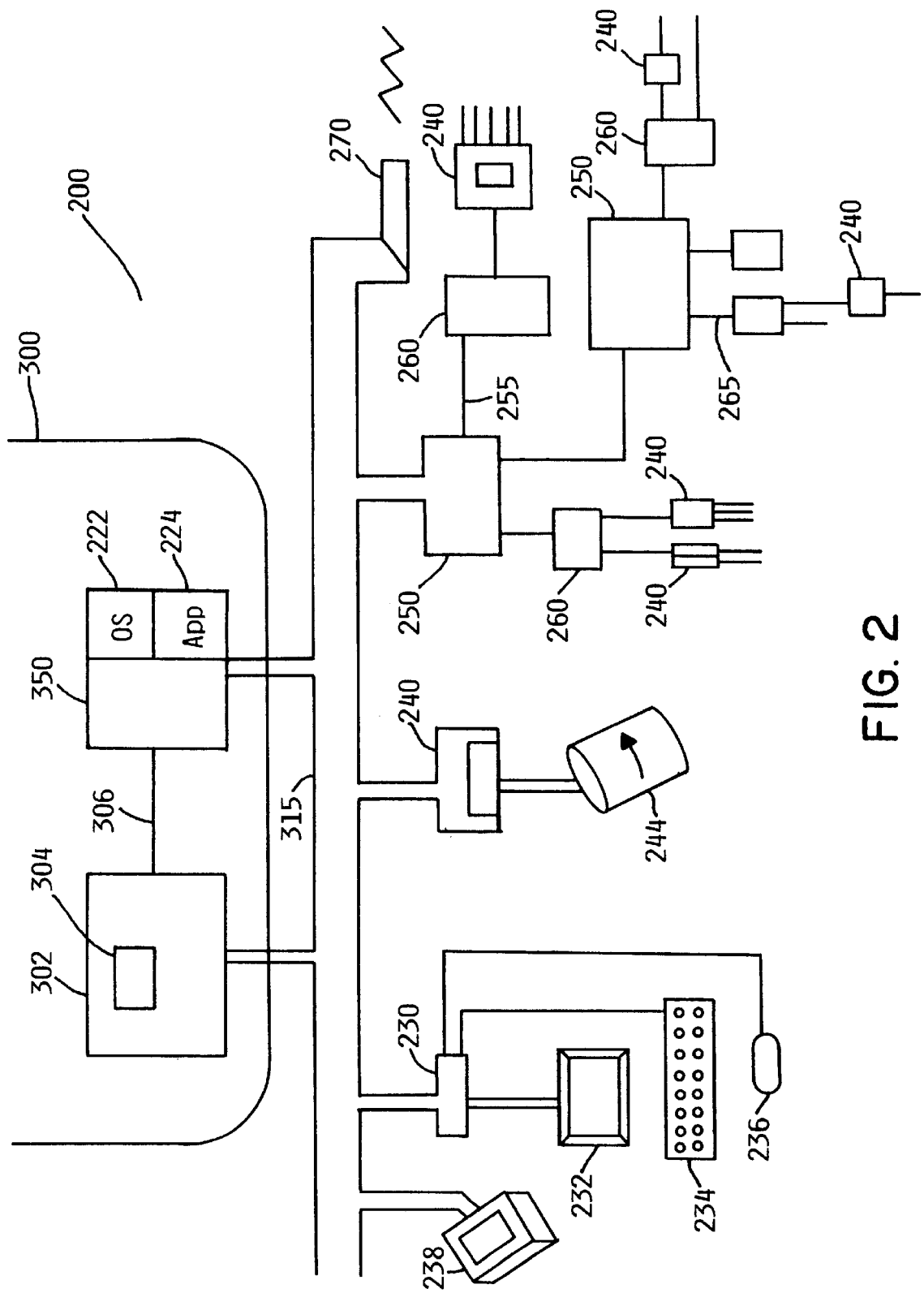
FIG. 2 is a high-level block diagram of a computer architecture capable of implementing the preferred embodiment of the invention.

FIG. 2 illustrates the components and an interconnection topology for an information handling system, typically a computer system 200, utilizing the present invention. Computer system 200 comprises a computer architecture 300 of one or more processor complexes 202 connected to an internal memory 150 by an internal bus 306 and/or a host system bus 315. The processor complex 302 has at least one computer processor 304 to execute program instructions stored in main memory 350. Although a single processor complex 302 is shown in FIG. 2, it should be understood that the computer architecture 300 may have many processor complexes 302 with one or more processors 304. The invention is designed to take advantage of any of the arrangements and architectures shown in FIGS. 1a through 1e, such as NUMA, COMA, and SMP, but is not limited to those shown in the Drawing. For instance, interconnected processing complexes may have varying numbers of processors and different levels of cache hierarchies. Not all the processors within a complex need be interconnected, just as not all the caches within a complex need be interconnected to each other or to every processor. The requirements of the invention will become clear in the foregoing description.

Memory 350 may be physically included within the processor complex 302 or connected to it via an internal bus system or via a host system bus 315. Memory 350 is a random access semiconductor memory for storing data and programs; memory 350 is shown conceptually as a single monolithic entity. In some computer architectures 300 memory is arranged as a hierarchy of caches as shown in FIGS. 1a and 1b. As discussed with respect to FIG. 1, a hierarchy of caches may be privately associated with each processor complex 302 or some or all of the caches may be shared with other processors and/or processor complexes 302. Memory 350 includes operating system (OS) 222 and application programs 224 for execution. Operating system 222 provides, inter alia, functions such as device drivers or interfaces, management of memory pages, management of multiple tasks, etc. as is known in the art. Applications 224 may include a server software application in which case network interface 270 may interact with a server software application 224 to enable computer system 200 to be a network server.

Host system bus 315 supports the transfer of data, commands, and other information between the processor complex 302 and any peripheral or external device attached to it, and any communication of data which may occur between the external devices independent of the processor complex 302. While shown in simplified form as a single bus, the host system bus 315 is typically structured as multiple buses which may be hierarchically arranged. Host system bus 315 is illustrated as being connected to a myriad of external or peripheral devices using a connection hub 230, an adapter 240, a multifunction adapter 250, or directly to a network 270. These peripheral devices may include a monitor or display 232, a keyboard 234, a mouse or other handheld device 236, and a printer 238. Display 232 may be a cathode-ray tube display, a flat panel display, or a touch panel, and other display technology. One or more adapters 240 may support keyboard 234 and pointing device 236 depicted as a mouse; it being understood that other forms of input devices could be used. The number and types of devices shown in FIG. 2 are illustrative only and ordinary users of computer systems now know that a great variety of connected devices exist, e.g., microphones, speakers, infrared remote controls, wireless, etc. It is anticipated that the computer system 200 not be limited to those devices illustrated in FIG. 2.

The host system bus 315 is also shown connected to an adapter 240 illustrated here as an I/O adapter connected to an external memory device 244. External memory device 244 may be rotating magnetic disk storage, e.g., a RAID-X configuration where X represents a particular embodiment, or rotating or static optical drives, or magnetic tape storage, etc. Adapters 240 may connect a wide variety of devices to the computer system 200 and to other adapter connected to other devices such as, but not limited to, tape drives, optical drives, printers, disk controllers, other bus adapters, PCI adapters, workstations using one or more protocols including, but not limited to, Token Ring, Gigabyte Ethernet, Ethernet, Fibre Channel, SSA, Fiber Channel Arbitrated Loop (FCAL), Ultra3 SCSI, Infiniband, FDDI, ATM, 1394, ESCON, wireless relays, Twinax, LAN connections, WAN connections, high performance graphics, etc., as is known in the art.

The host system bus 315 may also be connected to a multifunction adapter 250 to which more I/O devices may be connected either directly, or through one or more bridge devices 260, or through another multifunction adapter 250 on either a primary bus 255 or a secondary bus 265. Various components may be connected to the primary bus 255 including, for example, adapter 240, a bridge device 260, or another multifunction I/O processor or a multifunction adapter 280. The bridge device 260 bridges the primary bus 255 and a secondary bus 265 to which various adapters 240 may be connected. The adapters 240, the primary bus 255, and the secondary bus 265 may conform to the PCI/PCI-X or other industry bus specification. One skilled in the art realizes, however, that the implementation is not limited to a PCI/PCI-X or a SCSI or USB bus implementation but is applicable to any electrical or optical bus where data must be efficiently transferred. A wireless bus implementation may also be included as part of the invention herein.

Network interface 270 provides a physical connection for transmission of data to and from a network. The network may be Internet but could also be any smaller self-contained network such as an intranet, a WAN, a LAN, or other internal or external network using, e.g., telephone transmission lines, cable services, satellites, fiber optics, T1 lines, etc. and any various available technologies. Network interface 270 may comprise a modem connected to a telephone line through which an Internet access provider or on-line service provider is reached, but increasingly other higher bandwidth interfaces are implemented. For example, computer system 200 may be connected to another network server via a local area network using an Ethernet, Token Ring, or other protocol, or a second network server in turn being connected to the Internet. Alternatively, network interface 270 may be provided through cable television, fiber optics, satellites, wireless, or other connections.

Finally, computer system 200 need not be a computer at all, but may be a simpler appliance-like client device with less memory such as a network terminal, a thin client, a terminal-like devices, a voice response unit, etc. The convergence of computing, telecommunications and consumer electronics is causing a tremendous growth in the number and variety of pervasive mobile devices as clients. This mobile architecture enables the multitude of clients including laptops, sub-notebooks, handheld computers such as personal digital assistants and companion devices, and mobile appliances such as smartphones, pagers, simple messaging devices and wearable devices. Thus when the computer system 200 is a mobile device, the adapters 240 and network interfaces 270 support a variety of multi-modal interfaces including traditional keyboard and mouse interfaces, small text screens, pen, touch screens, speech recognition, text-to-speech and other emerging technologies like wearable devices. Such special-purpose devices for accessing the world wide web, such as an Internet access box for a television set, or a portable wireless web accessing device, which can implement an adapter for the purpose of communicating data to/from another computer system are also intended to be within the scope of a computer system 200.

The computer system shown in FIG. 2 is intended to be a simplified representation, it being understood that many variations in system configuration are possible in addition to those specifically mentioned here. While computer system 200 could conceivably be a personal computer system, the computer system 200 may also be a larger computer system such as an IBM Enterprise System or an IBM AS/400 system.

Figure 3:
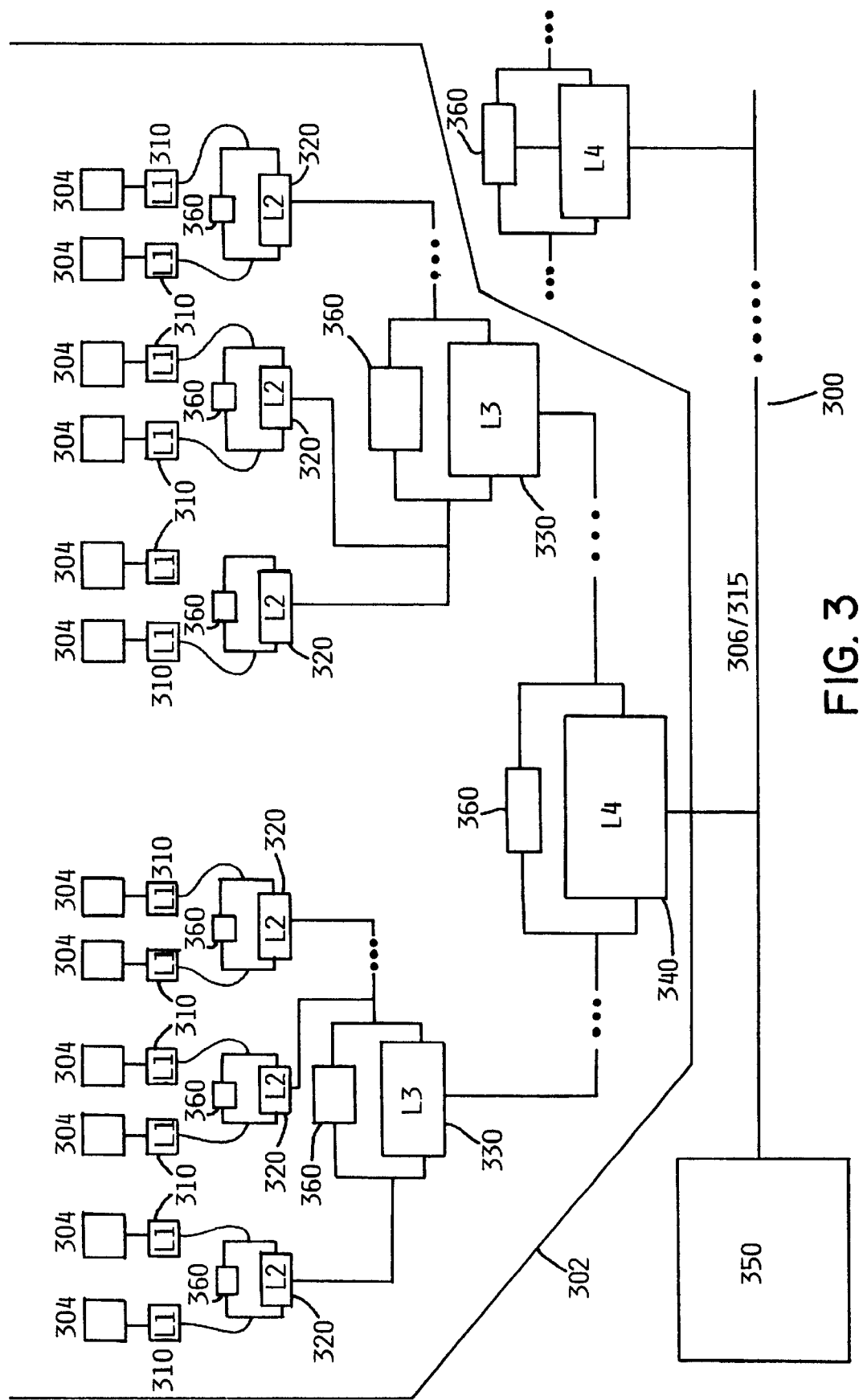
FIG. 3 is a simplified block diagram of a computer architecture implementing invalidation buffers with its caches in accordance with principles of the invention.

FIG. 3 is a simplified block diagram of a processor architecture 300 having invalidation buffers in accordance with the invention. A processor complex 302 has several processors 304, preferably at least two processors. Each processor 304 may have at least one private L1 cache 310 and there may be a separate private L1 for data and another separate and private L1 cache 310 for instructions. A higher level L2 cache 320 is shared between two processors 304 while three L2 caches may access the same L3 cache 330 as shown. Finally, a group six processors sharing the same L3 cache 330 may share a L4 cache 340 with one or more other groups of processors. The highest level L4 cache 340 may be connected to one or more memories 350 over an internal bus 306 or a system bus 315. The illustration of FIG. 3 is not intended to be a limiting view of the processor architecture 300. For instance, the L2 cache 320 need not be shared between two adjacent processors 304 throughout the processor complex, as shown. One L2 cache, for instance, may be shared and another may be private to a processor designated for special processor. Similarly with L3 and/or L4 caches. There may be higher level caches than a L4 cache. The architecture shown in FIG. 3 is illustrative only and the number of processors, the number and level of private and/or shared caches, the bus structure, and/or the memory configurations may vary. In the preferred embodiment, the caches should be coherent, i.e., they should be able to see coherence operations to ensure data integrity irrespective of whether the caches are hierarchical and/or shared.

Associated with a cache having the same cache coherency scheme as others is an invalidation buffer 360. An invalidation buffer 360 is a high speed register having a small number entries, preferably two to eight but more may be used given a large cache implementation. An entry in the invalidation buffer 360 is allocated when an invalidation request is received. An invalidation request is a request from a processor to invalidate a cache entry because the processor is modifying the data. An invalidation request changes the cache coherency state of the data to prevent access to that cache entry until the data has been modified. In accordance with principles of the invention, when a processor needs data from a cache, it first interrogates the invalidation buffer to quickly ascertain if the cache address has been invalidated. Interrogation of the invalidation buffer can often occur in two or fewer processor cycles. If the requested address is in the invalidation buffer, the processor can bypass the cache associated with the buffer having the entry.

Figure 4A:
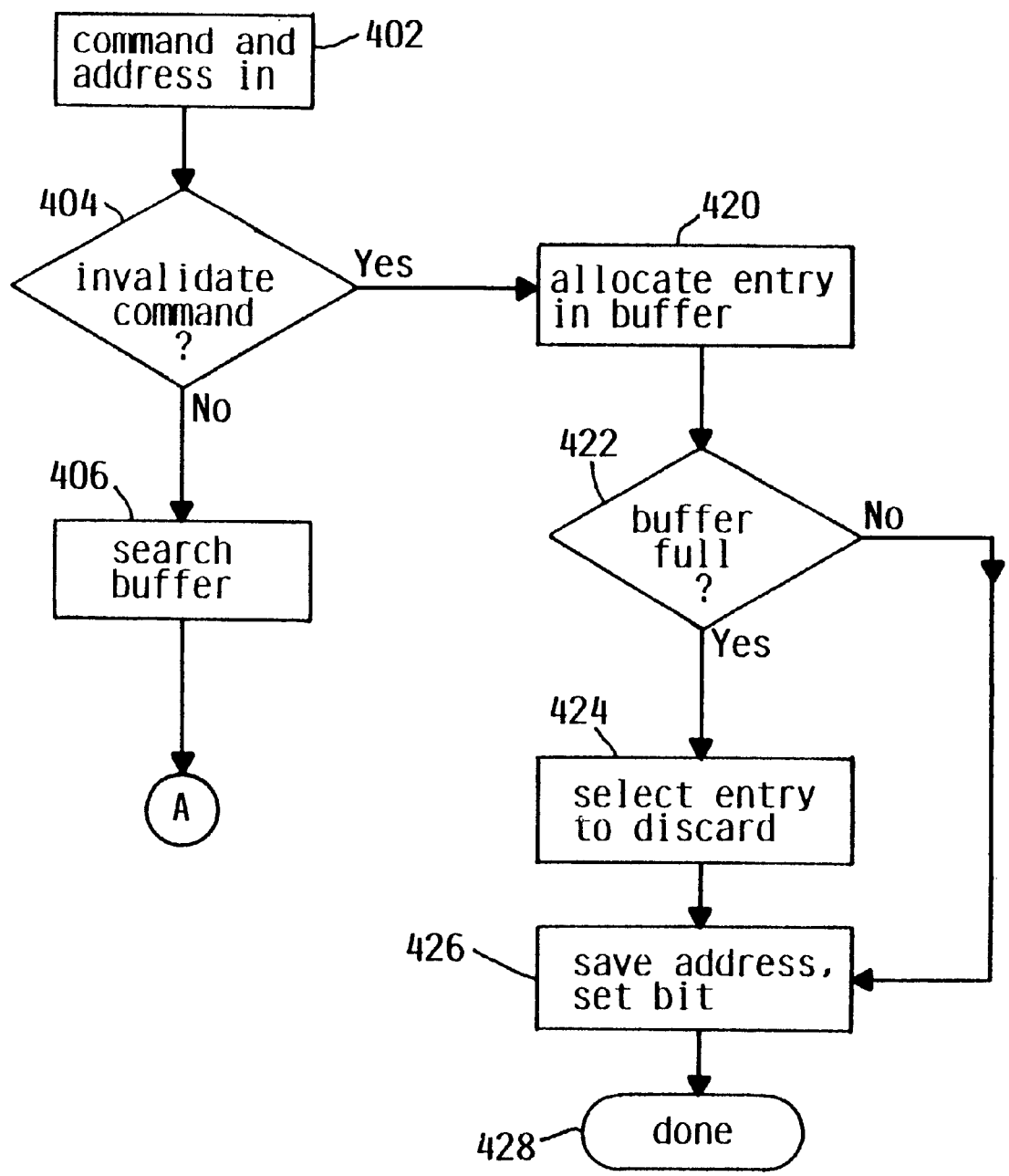
FIG. 4 is a simplified flow chart of how invalidation buffers can be used to bypass cache miss detection and/or to generate a speculative cache hit in an upper level cache in accordance with principles of the invention. It is suggested that FIG. 4 be printed on the face of the patent.
Figure 4B:
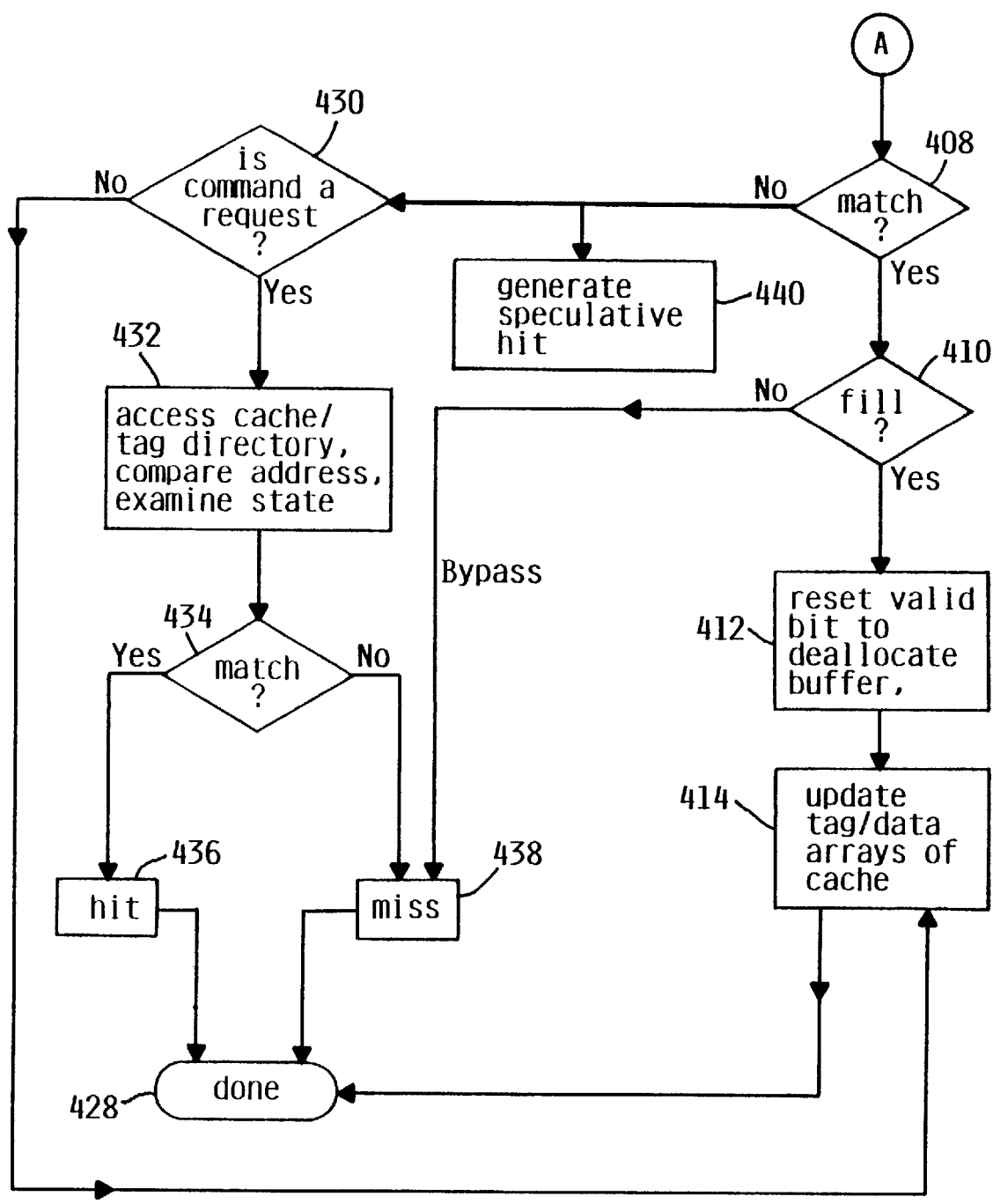

The principles of the invention by which the invalidation buffers may be used is illustrated in the simplified flow chart of FIG. 4. In block 402, a command and address enter the cache controller associated with that particular cache level. A command can be a request or a response to an earlier request. Of the various responses: a fill is a response to a cache miss, a writeback is generated when a modified cache block is replaced, and an acknowledgment of ownership is a response to write hits to cache blocks in the shared or exclusive states. A request can be a write or a read issued by a processor associated with the cache or an invalidation request issued by another processor. If the command is an invalidation request, as in block 404, an entry in the invalidation buffer associated with that cache is allocated in block 420. The invalidation buffer is first checked to determine if it is full, as in block 422. If the invalidation buffer is full, as in block 422, then a previous entry is selected to be discarded, as in block 424. The selection criteria may be any of several: random entries may be discarded or an oldest entry may be discarded, the newest entry, etc. In any event, in block 426, after an entry is made available or an entry existed, then the address is saved and a valid bit is set.

If, however, the command is not a request to invalidate data, then the invalidation buffer is searched in step 406. If the address matches with an address in the invalidation buffer, as in step 408, the address was recently invalidated and then in step 410, it is determined whether the command is a fill, i.e., a response to a read or write cache miss which fills the cache with the correct data. If so, then in step 412, the bit is reset in the buffer to indicate that the address is associated with valid data stored in the cache thus preserving cache coherency. In step 414, the tag array/cache directory and the data arrays are updated to reflect the updated valid data.

If there is no match in the invalidation buffer, a speculative cache hit can be generated, as in step 440. The speculative hit can be used to reserve an upper level cache entry. Thus, instead of allocating and reserving cache blocks on misses, a cache block can be reserved upon receiving the speculative hit from a lower level cache/buffer unit. This technique can reduce cache misses resulting from block replacement and could thus improve performance. The speculative hit can also be used to free up resources in the upper level control logic for an incoming response to a cache access.

In addition to generating a speculative cache hit in the absence of a matching address in the invalidation buffer in step 440, the command is decoded, as in step 430, to determine if the command is a request. If so, then the address of the incoming request is compared with addresses in the cache directory, as in step 432. If there is a match and the state is valid, i.e., not in the invalid state, then as in step 434 then there is a cache hit and the data associated with that data is used, as in step 436. If, however, there is no matching address, then there is a cache miss described by step 438 and the next lower levels of caches may be searched or the data may be retrieved from memory, other processors, or other processing complexes, again depending upon the architecture. If, however, the command is not a request for data in block 430, then the command is to write data to the cache so that the tag and data arrays of the cache are updated in step 414 to reflect the newly written data.

If the address of the incoming command is not an invalidation request but is present in the invalidation buffer, as in step 408, it means that the data has been recently invalidated. In step 410, a check is made to determine if the command is to fill the cache with the valid data. If so, then in step 412, the entry in the invalidation buffer is reset and the entry is deallocated from the buffer. At this time, the address is used, as in step 414, to update the tag and/or data arrays of the cache, depending on the type of response.

In step 410, if the incoming command is not an invalidation request (step 404) but does match an address in the invalidation buffer (steps 406 and 408) and is not a command to replace invalid data (step 410), it means that the data in the cache has recently been invalidated. In accordance with a feature of the invention, the cache directory is bypassed and a cache miss is generated as in step 438. Given the size of certain caches, bypassing the cache directory to forego address comparison may save many processor cycles. In some instances, however, as with certain L1 caches, there is no benefit to be gained by incorporating the invalidation buffer because the L1 cache is fast enough.

As discussed, in step 412, an entry in the invalidation buffer is deallocated when a fill command is received. In the presence of the invalidation buffer, the cache directory is bypassed. Therefore, a cache entry is not reserved for the incoming fill. The speculative hit generated in step 414 can be used to reserve an upper level cache entry. Instead of allocating/reserving cache blocks on cache misses, a block of the upper cache can be reserved upon receiving the speculative hit from the lower level unit. This reduces cache misses because of block replacement and thus improves performance.

Figure 5:
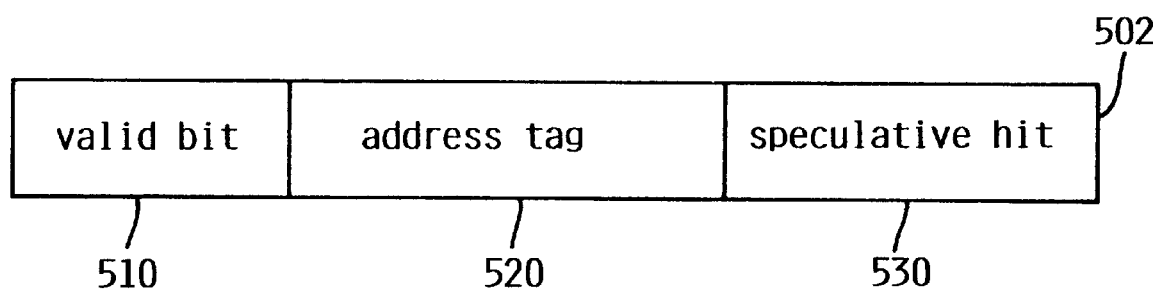
FIG. 5 is an example of an entry in the invalidation buffer.

FIG. 5 is an example of an entry 502 in the invalidation buffer. There should be a minimal number of entries in the invalidation buffer, preferably two to eight, depending upon the size of the cache associated with the invalidation buffer. For instance, some invalidation buffers associated with very large caches may have more than eight entries; the key point here is that evaluating the invalidation buffer saves time over querying the cache itself. Each entry then will have a field 510 to designate whether the address is valid. Of course, if the address is valid, the entry will be deallocated based on a scheme as discussed earlier. A second field 520 contains the address of the most recently invalidation request received by the cache associated with the invalidation buffer. A third field 530 contains a bit to indicate if the entry can be used as a speculative hit and reserve a cache block in the next higher level cache.

In another embodiment of the invention, an invalidation buffer need only be associated with the highest level cache when the processor has a hierarchy of private caches, such as in FIG. 1a. Under these circumstances, a bypass at an upper level, i.e., a L2 cache, necessarily means that the lower level caches (L3 . . . Ln) will also bypass its directory. Therefore it is only necessary to associate an invalidation buffer with the highest level cache and generate a bypass command through to memory. When a lower level cache receives the bypass command, it will simply forward the command to the next lower level or to the system interconnect. In the architecture having caches shared between processors, however, such a simple solution will not work as easily because the L3 cache may have data that has not been in the L2 cache.

While the invention has been described in connection with what is presently considered the most practical and preferred embodiments, it is to be understood that the invention is not limited to the disclosed embodiments, but on the contrary, is intended to cover various modifications and equivalent arrangements included within the spirit and scope of the appended claims.

What is claimed is:

1. In a computer system, a method of managing a processor-cache system, comprising the steps of:

(a) storing addresses of invalidation requests to invalidate data in a cache in an invalidation buffer associated with the cache;

(b) receiving an incoming command for the cache;

(c) determining that an address associated with the incoming command is in the invalidation buffer;

(d) if the address associated with the incoming command is not in the invalidation buffer, then generating a speculative cache hit; and transferring the speculative cache hit to a processor or a higher level cache that forwarded the incoming command; and (e) determining if the incoming command is to replace the invalidated address with a valid address; and if the incoming command is not to replace the invalidated address with a valid address, then bypassing the cache.

2. A computer system for processing commands, comprising:

(a) at least one processor to execute an operating system and commands;

(b) a main memory connected to at least one processor;

(c) at least one cache connected near and accessible by the at least one processor to provide and store data to/from the at least one processor;

(d) at least one invalidation buffer associated with the at least one cache wherein invalidation requests are stored;

(e) at least one lower level cache connected to the at least one processor, the lower level cache between the at least one cache and main memory; and (f) at least one lower level invalidation buffer associated with the at least one lower level cache.

3. The computer system of claim 2, further comprising one or another of the at least one other processor connected to the at least one lower level cache and the at least one lower level invalidation buffer, all connected processors and caches maintaining cache coherency.

4. A system for expediting cache misses in a processor, comprising:

(a) means to cache data and corresponding addresses;

(b) means to buffer the most recent invalidation requests to invalidate data and addresses in the cache means;

(c) means to receive a command having an address;

(d) means to determine if the command is to access the cache means;

(e) means to determine if the command address is within the buffer means;

(f) means to bypass the cache means if the command address is within the buffer means; and (g) means to bypass the cache means having the command address if the command address is within the buffer means and if cache coherency is maintained by the cache means; and (h) means to generate a speculative hit of the cache means if the command address is not within the buffer means.

5. The system of claim 4, further comprising means to reserve an address block of an upper level cache means in response to the generating means.

* * * * *